(12) United States Patent
Guo et al.

(10) Patent No.: US 12,474,884 B2
(45) Date of Patent: Nov. 18, 2025

(54) METHOD AND APPARATUS FOR IMPLEMENTING VIDEO CONFERENCE, ELECTRONIC DEVICE AND COMPUTER-READABLE STORAGE MEDIUM

(71) Applicant: ZTE CORPORATION, Guangdong (CN)

(72) Inventors: Teng Guo, Guangdong (CN); Yifang Yu, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 213 days.

(21) Appl. No.: 18/009,572

(22) PCT Filed: May 17, 2021

(86) PCT No.: PCT/CN2021/094092
§ 371 (c)(1),
(2) Date: Dec. 9, 2022

(87) PCT Pub. No.: WO2021/249121
PCT Pub. Date: Dec. 16, 2021

(65) Prior Publication Data
US 2023/0342103 A1    Oct. 26, 2023

(30) Foreign Application Priority Data

Jun. 10, 2020   (CN) .......................... 202010521969.9

(51) Int. Cl.
*H04N 5/262*     (2006.01)
*G06F 3/14*      (2006.01)
(Continued)

(52) U.S. Cl.
CPC ........ *G06F 3/1454* (2013.01); *H04L 65/1069* (2013.01); *H04L 65/1093* (2013.01); *H04N 5/2624* (2013.01)

(58) Field of Classification Search
CPC .......................... H04L 65/1069; H04N 5/2624
See application file for complete search history.

(56) References Cited

U.S. PATENT DOCUMENTS

| 2016/0073058 | A1 | 3/2016 | Bader-Natal |
| 2017/0104797 | A1 | 4/2017 | Venkatesh |
| 2019/0102922 | A1* | 4/2019 | Gum .................. G01C 21/3667 |

FOREIGN PATENT DOCUMENTS

| CN | 1678063 A | 10/2005 |
| CN | 1838764 A | 9/2006 |

(Continued)

OTHER PUBLICATIONS

China Patent Office, CN202010521969.9 First Office Action issued on Aug. 21, 2024.
(Continued)

*Primary Examiner* — Amal S Zenati
(74) *Attorney, Agent, or Firm* — Li & Cai Intellectual Property (USA) Office

(57) ABSTRACT

Embodiments of the present disclosure relate to the technical field of cloud computing, and provide a method and an apparatus for implementing a video conference, an electronic device and a computer-readable storage medium. The method for implementing a video conference includes: acquiring video conference main window information in video conference window information, where the video conference window information includes the video conference main window information and video conference auxiliary window information; and synchronously displaying the video conference main window information and the video conference auxiliary window information, where the video conference auxiliary window information is displayed at a cloud desktop server.

12 Claims, 9 Drawing Sheets

(51) Int. Cl.
*H04L 65/1069* (2022.01)
*H04L 65/1093* (2022.01)

(56) References Cited

FOREIGN PATENT DOCUMENTS

| | | |
|---|---|---|
| CN | 101031065 A | 9/2007 |
| CN | 101808220 A | 8/2010 |
| CN | 102185870 A | 9/2011 |
| CN | 103442060 A | 12/2013 |
| CN | 103457746 A | 12/2013 |
| CN | 103475850 A | 12/2013 |
| CN | 103546717 A | 1/2014 |
| CN | 103843323 A | 6/2014 |
| CN | 104540027 A | 4/2015 |
| CN | 106027679 A | 10/2016 |
| CN | 109218653 A | 1/2019 |
| CN | 110446001 A | 11/2019 |
| EP | 3487148 A1 | 5/2019 |

OTHER PUBLICATIONS

European Patent Office, EP21822659.5 Extended European Search Report issued on Jun. 4, 2024.
WIPO, International Search Report issued on Jul. 12, 2021.

* cited by examiner

METHOD AND APPARATUS FOR IMPLEMENTING VIDEO CONFERENCE, ELECTRONIC DEVICE AND COMPUTER-READABLE STORAGE MEDIUM

The present application claims priority from the Chinese patent application No. 202010521969.9 filed with the China Patent Office on Jun. 10, 2020, the entire contents of which are incorporated herein by reference.

TECHNICAL FIELD

The present disclosure relates to the technical field of cloud computing.

BACKGROUND

The cloud desktop access mode may support the access of various terminals, such as a personal computer (PC), a thin terminal, a mobile phone, a tablet and the like, and be compatible with various operating systems such as Windows, Linux and the like. Therefore, the cloud desktop may be used for remote office and video conferences.

SUMMARY

In one aspect, an embodiment of the present disclosure provides a method for implementing a video conference, including: acquiring video conference main window information in video conference window information, where the video conference window information includes the video conference main window information and video conference auxiliary window information; and synchronously displaying the video conference main window information and the video conference auxiliary window information, where the video conference auxiliary window information is displayed at a cloud desktop server.

In another aspect, an embodiment of the present disclosure provides a method for implementing a video conference, including: forwarding, in response to a video conference joining message, video conference main window information in video conference window information to a cloud desktop client, to synchronously display the video conference main window information and video conference auxiliary window information in the video conference window information; where the joining message is a message sent by an attendee through a cloud desktop client for confirming participation in the video conference, the video conference main window information is displayed at the cloud desktop client, and the video conference auxiliary window information is displayed at a cloud desktop server.

In yet another aspect, an embodiment of the present disclosure provides an apparatus for implementing a video conference, including: a client acquisition module configured to acquire video conference main window information in video conference window information, where the video conference window information includes the video conference main window information and video conference auxiliary window information; and a display module configured to synchronously displaying the video conference main window information and the video conference auxiliary window information, where the video conference auxiliary window information is displayed at a cloud desktop server.

In yet another aspect, an embodiment of the present disclosure provides an apparatus for implementing a video conference, including: a sending module configured to forward, in response to a video conference joining message, video conference main window information in video conference window information to a cloud desktop client, to synchronously display the video conference main window information and video conference auxiliary window information in the video conference window information; where the video conference main window information is displayed at the cloud desktop client, and the video conference auxiliary window information is displayed at a cloud desktop server.

In yet another aspect, an embodiment of the present disclosure provides a computer-readable storage medium having one or more programs stored thereon, where the one or more programs are executable by one or more processors to implement at least one operation of the method for implementing a video conference according to any embodiment of the present disclosure.

DETAIL DESCRIPTION OF EMBODIMENTS

Figure 1:
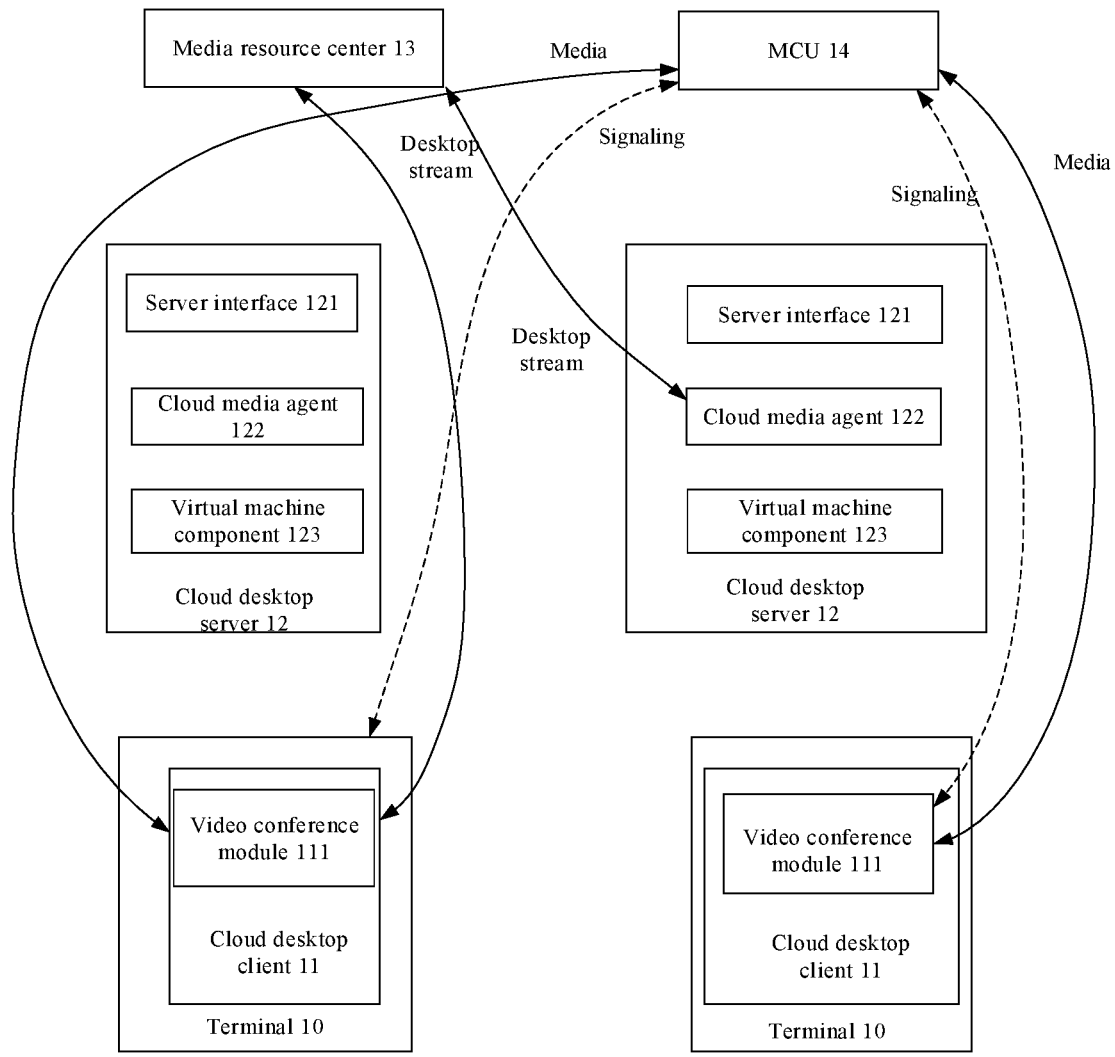
FIG. 1 is a schematic block diagram of a video conference system according to an embodiment of the present disclosure.

In order to make those skilled in the art better understand the technical solutions of the present disclosure, the following describes the method and apparatus for implementing a video conference, the electronic device, and the computer-readable storage medium of the present disclosure in detail with reference to the accompanying drawings.

Example embodiments will be described more sufficiently below with reference to the accompanying drawings, but which may be embodied in different forms and should not be construed as limited to the embodiments set forth herein. Rather, these embodiments are provided so that the present disclosure will be thorough and complete, and will fully convey the scope of the present disclosure to those skilled in the art.

As used herein, the term "and/or" includes any and all combinations of one or more of the associated listed items.

The terminology used herein is for the purpose of describing specific embodiments only and is not intended to limit the present disclosure. As used herein, the singular forms "a", "an" and "the" are intended to include the plural forms as well, unless the context clearly indicates otherwise. It will be further understood that as used herein, the terms "comprise" and/or "consist of . . . " specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the existing art and the present disclosure, and will not be interpreted in an idealized or overly formal sense unless expressly so defined herein.

When a cloud desktop is used for a video conference, acquisition and playing of video images and sounds not only occupy a great deal of resources of a network bandwidth cloud server, but also tend to cause a super heavy load on the cloud server as well as a poor video display effect. This is because the related desktop sharing mode includes firstly capturing a screenshot of contents of the shared desktop, and then coding and sending the screenshot of the contents to a member terminal, where the screenshot of the contents is decoded and displayed. If desktop sharing is still implemented in the screenshot, coding and decoding mode in the cloud desktop scene, not only system resources of the cloud server is occupied and the load of the server is increased, the video display effect is also poor.

A main purpose of the embodiments of the present disclosure is to provide a method and an apparatus for implementing a video conference, an electronic device and a computer-readable storage medium, which are intended to, when a cloud desktop is used for a video conference, reduce the occupied network bandwidth and cloud server resources, and improve the video display effect.

According to the method for implementing a video conference provided in the embodiments of the present disclosure, by means of a video conference system, a display part of the video conference system is stripped to a terminal, namely, acquisition and playing of the video are both implemented at the terminal, so that a number of desktop stream reciprocations between the terminal and the cloud desktop is reduced, the occupied network bandwidth resources, as well as the occupied cloud server resources, are reduced.

FIG. 1 is a schematic block diagram of a video conference system according to an embodiment of the present disclosure. In FIG. 1, solid lines represent the desktop stream and the medium, while dashed lines represent signaling. As shown in FIG. 1, the video conference system includes a cloud desktop client 11 and a cloud desktop server 12. The cloud desktop client 11 is disposed on a terminal 10, such as a mobile phone, a pad, a computer, or any other smart device. When a user is to conduct a video conference, the cloud desktop client 11 may be started at the terminal 10.

According to an embodiment of the present disclosure, the cloud desktop client 11 is mainly configured to initiate a video conference, manage video conference members, and the like. The cloud desktop client 11 includes a video conference module 111, which includes a media presentation unit (client conference interface), a message center unit, and a main control unit. The client conference interface includes merely a main window of the video conference, without any auxiliary window. According to an embodiment of the present disclosure, the auxiliary window of the video conference includes, but is not limited to, a menu bar of the video conference. It is easy to be understood that the cloud desktop client 11 displays main window information other than the menu bar.

According to an embodiment of the present disclosure, the cloud desktop server 12 includes a server interface 121, a cloud media agent 122, and a virtual machine component 123. The server interface 121 is configured to display video conference auxiliary window information, such as a menu bar of a video conference, and the video conference auxiliary window information is displayed in synchronization with video conference main window information displayed at the cloud desktop client 11. The cloud media agent 122 may perform information transmission with the video conference module 111 of the cloud desktop client 11, such as transmit a desktop stream, and receive information such as a video conference invitation from the video conference module 111. The virtual machine component 123 is configured to transmit a link establishment parameter when a link between the cloud media agent 122 and the video conference module 111 is established, notify the cloud media agent 122 when the link is broken, and initiate a reconnection request when disconnection with the video conference module 111 is detected.

According to an embodiment of the present disclosure, the video conference system further includes a media resource center 13 and a video conference server or a multi control unit (MCU) 14. The MCU 14 sends media related parameters, such as an MCU address, a port number, a media receiving format, or other information to the video conference module 111. The cloud media agent 122 sends a main window message to the video conference module 111, including window maximization, minimization, movement, dragging, or the like, and information of an occlusion location of the main window. During desktop sharing, the cloud media agent 122 further applies to the cloud desktop server for a sharer desktop stream, and then forwards the desktop stream to the media resource center 13. The media resource center 13 is configured to send the desktop stream of the shared desktop to cloud desktop clients of other attendees.

Figure 2:
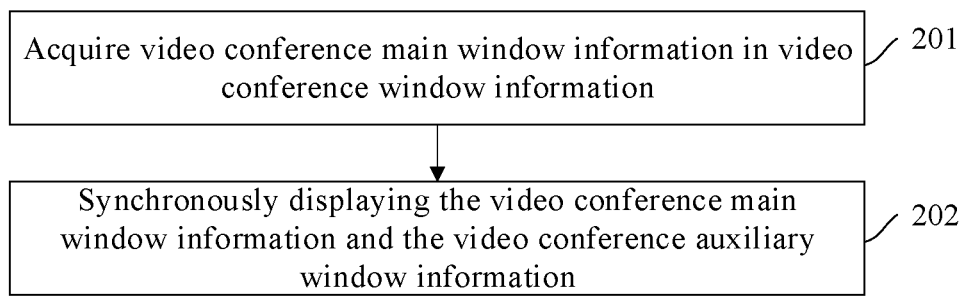
FIG. 2 is a flowchart of a method for implementing a video conference according to an embodiment of the present disclosure.

An embodiment of the present disclosure provides a method for implementing a video conference, which is applicable to a cloud desktop client. FIG. 2 is a flowchart of a method for implementing a video conference according to an embodiment of the present disclosure. Referring to FIG. 2, the method for implementing a video conference may include the following operations 201 and 202.

At operation 201, acquiring video conference main window information in video conference window information.

According to an embodiment of the present disclosure, the video conference window information includes the video conference main window information and video conference auxiliary window information. The video conference main window information includes specific contents of the video conference, such as materials displayed in the video conference, or other information. The video conference auxiliary window information includes a menu bar of the video conference.

At operation 202, synchronously displaying the video conference main window information and the video conference auxiliary window information. The video conference auxiliary window information is displayed at a cloud desktop server.

According to an embodiment of the present disclosure, the video conference main window information is displayed at the cloud desktop client, and the video conference auxiliary window information is displayed at a cloud desktop server. In other words, the cloud desktop client displays merely the video conference main window information, rather than the video conference auxiliary window information. Meanwhile, the cloud desktop server displays merely auxiliary window information of the video conference. According to the embodiment of the present disclosure, a display part of the video conference is stripped to a terminal, so that the data transmission amount between the cloud desktop client and the cloud server is reduced, the network bandwidth resource is saved, and the load capacity of the cloud server is reduced, while the display effect of the cloud desktop client is improved.

In a possible implementation, the video conference main window information and the video conference auxiliary window information are simultaneously sent to the cloud desktop client and the cloud desktop server, respectively, so that the cloud desktop client displays the acquired video conference main window information in real time. Meanwhile, the cloud desktop server displays the acquired video conference auxiliary window information in real time, so as to ensure synchronous display of the video conference main window information and the video conference auxiliary window information.

In a possible implementation, the video conference main window information includes main window location information and main window size information, and the video conference main window information is sent to the cloud desktop client via the cloud media agent, and displayed by the media presentation unit in the video conference module. When a location or a size of the main window of the video conference is changed, a video conference module window also changes correspondingly. For example, as the main window of the video conference moves from left to right, the video conference module window also changes accordingly. When the main window of the video conference is minimized, the video conference module window is moved out of a screen of the terminal.

In a possible implementation, when the main window of the video conference is occluded by another window, the cloud desktop client, while obtaining the video conference main window information, obtains window occlusion information. When the video conference main window information and the video conference auxiliary window information are synchronously displayed, the occluded part of the video conference main window is not displayed.

For example, when the main window of the video conference is occluded by another window, the video conference module window cuts the corresponding occlusion location. When the main window of the video conference is completely occluded by another window, the video conference module window is moved out of the screen of the terminal.

Figure 3:
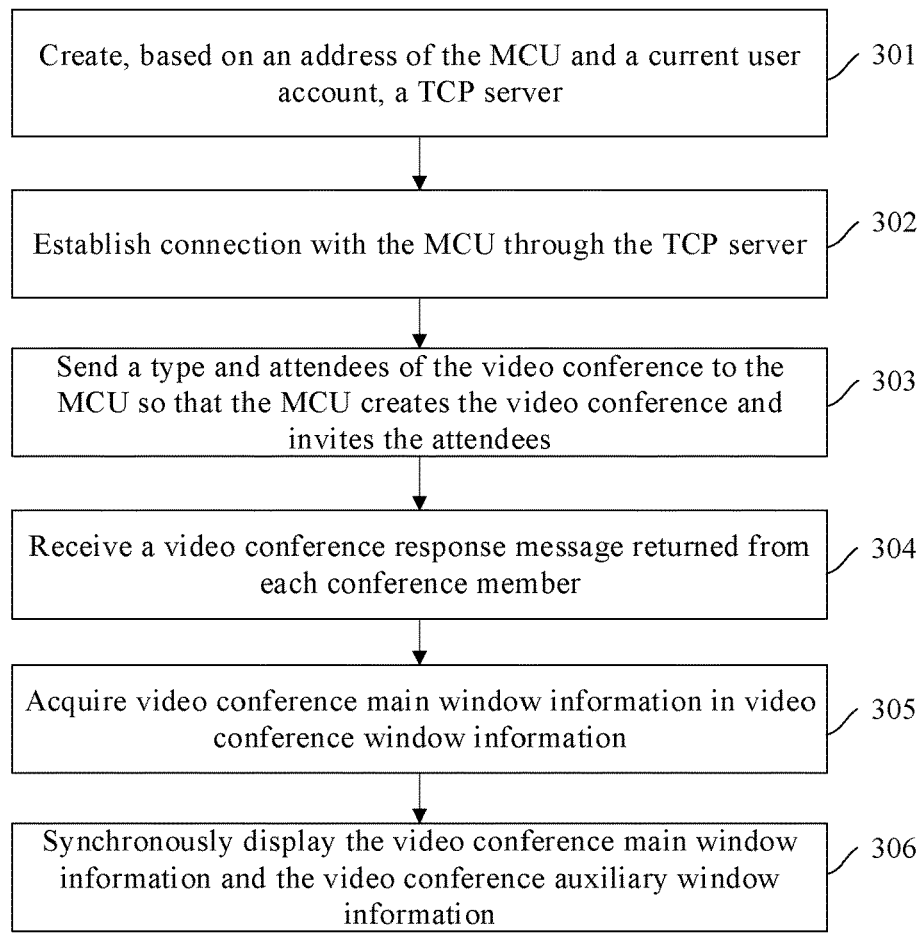
FIG. 3 is another flowchart of a method for implementing a video conference according to an embodiment of the present disclosure.

FIG. 3 is another flowchart of a method for implementing a video conference according to an embodiment of the present disclosure. As shown in FIG. 3, the method for implementing a video conference may include operations 301 to 306.

At operation 301, creating, based on an address of the MCU and a current user account, a transmission control protocol (TCP) server.

The address of the MCU is an address of the MCU provided at the cloud, and the current user account is an account of a user who initiates the video conference.

In a possible implementation, when a user starts a video conference at a cloud desktop client, the video conference module and the cloud media agent disposed at the terminal are pulled up. The address of the MCU and a user name (account) of the current user who logs in the MCU are transmitted to the video conference module, where the video conference module creates, based on the address of the MCU and the current user account, a TCP server, and returns to the cloud desktop client a monitoring port of the video conference module.

The address of the MCU may be directly input by the user at the terminal, or may be selected from options. An IP address and a monitoring port of the cloud desktop server, an IP address and a monitoring port of the media resource center, and a monitoring port of the virtual machine component are transmitted to the cloud media agent as starting parameters, where the cloud media agent establishes connection with the virtual machine component with the starting parameters.

At operation 302, establishing connection with the MCU through the TCP server.

In operation 302, the cloud desktop client sends the monitoring port of the video conference module and an IP address of the terminal to the virtual machine component through a desktop protocol, then the virtual machine component sends the monitoring port of the video conference module and the IP address of the terminal to the cloud media agent through a TCP link, and the cloud media agent establishes connection with the video conference module according to the IP address of the terminal and the monitoring port of the video conference module. The video conference module is connected to the MCU, and logs in the MCU according to the user account.

In a possible implementation, when the video conference is initiated by an initiator of the video conference, the cloud desktop client where the initiator of the video conference is located performs operations 303 to 306.

At operation 303, sending a type and attendees of the video conference to the MCU so that the MCU creates the video conference and invites the attendees.

Types of the video conference include single-point conference, video conference, and voice conference. The MCU creates a video conference according to a video conference type expected by the initiator, and then invites conference members according to the attendees provided by the initiator.

In a possible implementation, the initiator (chairman) of the video conference selects attendees to be invited by querying an address book or recent meeting records. When no video conference exists, the initiator may create a video conference at the MCU. For example, the initiator sends a type and attendees of the video conference to the MCU, which in turn creates a video conference and invites the attendees.

According to an embodiment of the present disclosure, when the MCU creates the video conference, if the video conference fails to be created, an ERROR message is returned to the initiator. If the video conference is successfully created, a success message and a number of the created video conference are returned to the initiator. The number of the created video conference may be contained in the returned success message, that is, the number of the created video conference is sent to the initiator together with the success message that indicates successful creation of the video conference, or, the number of the created video conference and the success message that indicates successful creation of the video conference are sent to the initiator separately.

After the MCU creates the video conference, the video conference module may be connected to the MCU, and logs in the MCU with a user name, where the MCU checks the logged-in user. For example: firstly, it is checked whether an invited attendee is in another conference. If the invited attendee is in another conference, a response message indicating that the attendee cannot join the conference now is returned to the initiator. If the invited attendee is off-line or cannot be connected for other reasons, a response message indicating that the attendee cannot join the conference now is returned to the initiator. After the MCU determines the conference members able to join the conference, a participation invitation is sent to each conference member able to join the conference. When a conference invitation message is received at a member video conference module, the conference invitation message is forwarded to the cloud media agent which, after receiving the conference invitation message, may send a prompt message through a popup window. The attendee may choose to accept or reject the conference invitation and send a response message to the member video conference module, which forwards the response message to the MCU, and then to the video conference module corresponding to the initiator.

At operation 304, receiving a video conference response message returned from each conference member.

The video conference response message includes a message indicating whether the invited conference member will join the conference. For example, when the invited conference member selects to join the conference, a participation response message is returned; and when the invited conference member selects not to join the conference, a participation reject response message is returned.

In operation 304, the initiator of the video conference obtains the video conference response message of each attendee through the MCU. When the initiator of the video conference receives the video conference response message from each attendee, the video conference can be carried out.

In a possible implementation, when the cloud desktop client logs in the video conference system, if the user does not use the video conference system, the video conference system may be minimized at a lower right corner of the cloud desktop. When a user asks to join the video conference, a prompt message will pop up at the cloud desktop client.

According to an embodiment of the present disclosure, each conference member of the video conference sends a response message of whether to join the video conference to the MCU through the video conference module at the cloud desktop client. For example, when a conference member receives a video conference invitation message, a video conference response message is returned through the video conference module, where the video conference response message includes accepting or rejecting the video conference request.

At operation 305, acquiring video conference main window information in video conference window information.

At operation 306, synchronously displaying the video conference main window information and the video conference auxiliary window information, where the video conference auxiliary window information is displayed at a cloud desktop server.

The operations 305 and 306 are respectively the same as operations 201 and 202, and thus are not repeated here.

In a possible implementation, the conference members of the video conference (including the initiator and the attendees of the video conference) may perform collaborative office work by means of the cloud desktop client, thereby implementing desktop sharing or application sharing.

Figure 4:
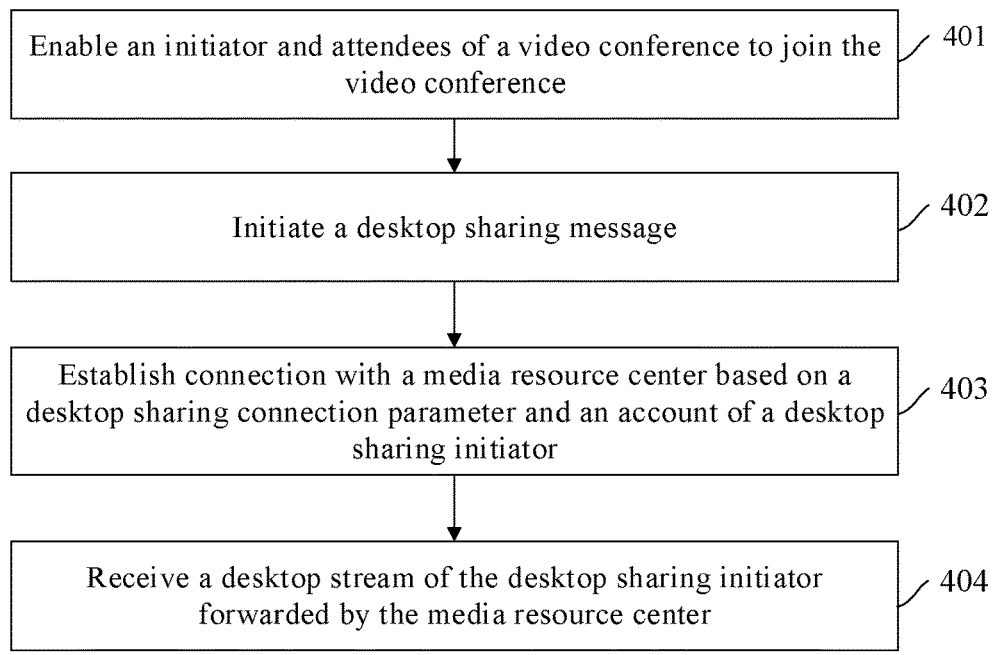
FIG. 4 is still another flowchart of a method for implementing a video conference according to an embodiment of the present disclosure.

FIG. 4 is still another flowchart of a method for implementing a video conference according to an embodiment of the present disclosure. As shown in FIG. 4, the method for implementing a video conference may include operations 401 to 404.

At operation 401, enabling an initiator and attendees of a video conference to join the video conference.

In a possible implementation, the initiator and the attendees of the video conference may join the video conference through operations 301 through 304.

At operation 402, initiating a desktop sharing message. The desktop sharing message includes a conference number and an initiator account the video conference.

In operation 402, either the initiator or an attendee of the video conference may initiate a desktop sharing request, and when the desktop sharing request is initiated, the desktop sharing initiator sends the conference number and the account number of the initiator of the video conference to other conference members.

In a possible implementation, the desktop sharing initiator sends the conference number and the account number of the initiator of the video conference to the MCU, which then sends the desktop sharing request to other members of the video conference. If any other conference member has started a desktop sharing function, an ERROR message is returned to the MCU. If other conference members do not start a desktop sharing function, it indicates that desktop sharing is available, and an OK message is returned to the MCU.

At operation 403, establishing connection with a media resource center based on a desktop sharing connection parameter and an account of a desktop sharing initiator. The desktop sharing connection parameter is a parameter generated by the media resource center based on the conference number and the initiator account of the video conference.

The MCU sends the conference number and the initiator account to the media resource center, where the media resource center correspondingly generates the desktop sharing connection parameter and the initiator account, and sends the desktop sharing connection parameter and the initiator account to the MCU, so that the MCU sends the desktop sharing connection parameter and the initiator account to all members of a same conference room. When a video conference module corresponding to a non-initiator receives the desktop sharing connection parameter and the initiator account, the cloud desktop client of the non-initiator is pulled up, and the cloud desktop client may obtain a desktop stream of the shared desktop from the media resource center according to the desktop sharing connection parameter and the initiator account.

It should be noted that, according to an embodiment of the present disclosure, the desktop sharing connection parameter and the initiator account are sent to the cloud desktop client through the MCU, and the cloud desktop client receives the desktop stream of the shared desktop. In another possible implementation, the desktop sharing connection parameter and the initiator account are sent to a desktop sharing client through the MCU. The desktop sharing client is disposed on the terminal and in communication with the video conference module, and obtains a desktop stream of the shared desktop from the media resource center according to the desktop sharing connection parameter and the initiator account.

In a possible implementation, the media resource center obtains the desktop stream of a sharer in a variety of ways. One way of obtaining the desktop stream is described below. For example, when an attendee of the video conference wants to share a desktop, a desktop sharing message is sent to the cloud media agent which, after receiving the desktop sharing message, sends an initiator account to the cloud desktop server, and the cloud desktop server sends a desktop stream of the desktop sharing initiator to the cloud media agent, and then to the media resource center. Other attendees of the video conference may obtain the desktop stream of the desktop sharing initiator from the media resource center.

At operation 404, receiving a desktop stream of the desktop sharing initiator forwarded by the media resource center.

When the desktop sharer terminates the desktop sharing, the desktop sharing initiator sends a stop desktop sharing message to the MCU, which forwards the stop desktop sharing message to the video conference module of each attendee of the video conference, and then to the desktop sharing client which is closed or minimized.

Figure 5:
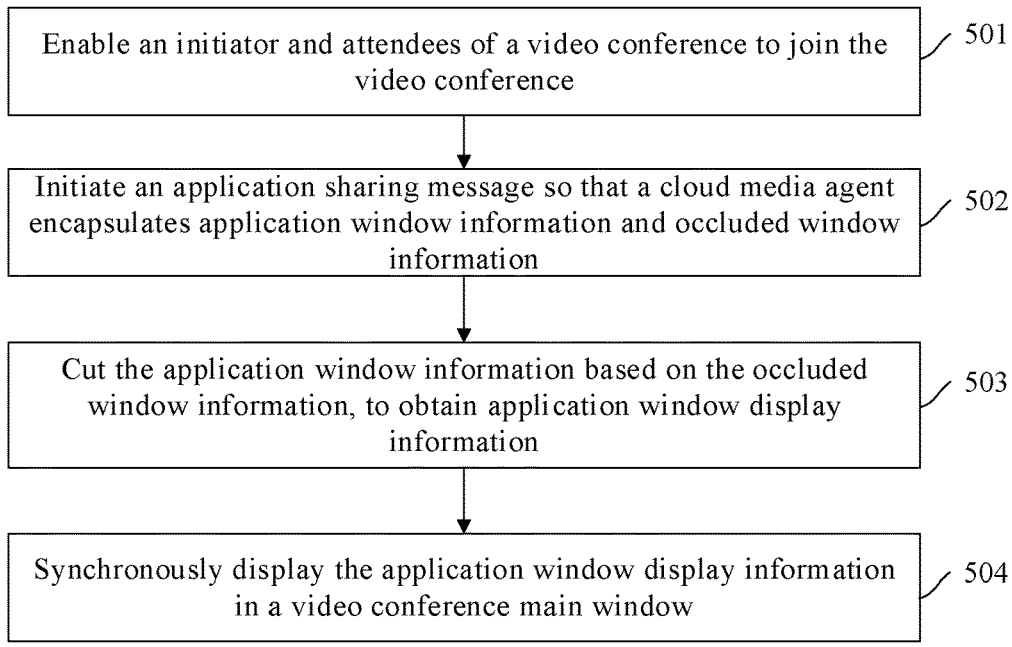
FIG. 5 is yet another flowchart of a method for implementing a video conference according to an embodiment of the present disclosure.

In a video conference, it is usually not desirable to share the entire desktop, but merely a certain application, i.e., other attendees can see merely a video of the application. FIG. 5 is yet another flowchart of a method for implementing a video conference according to an embodiment of the present disclosure. As shown in FIG. 5, the method for implementing a video conference may include operations 501 to 504.

At operation 501, enabling an initiator and attendees of a video conference to join the video conference.

In a possible implementation, the initiator and the attendees of the video conference may join the video conference through operations 301 through 304.

At operation 502, initiating an application sharing message so that a cloud media agent encapsulates application window information and occluded window information.

The application window information is information of a displayed application window, such as contents displayed in an application window. The occluded window information is information of an occluded application window. For example, when an application window is occluded by another window, merely a non-occluded part of the application window is displayed.

In operation 502, any attendee of the video conference may initiate an application sharing message. An application sharing initiator sends an application sharing message to the cloud media agent, which opens the shared application and sets a window of the shared application as a child window of a cloud sharing agent. The shared application may be an application already opened by the cloud media agent, such as an application selected from applications already opened, or may be an application newly opened.

An initiator account is carried in the application sharing message, the cloud media agent sends the initiator account to the cloud desktop server, which then sends a desktop stream corresponding to the initiator account to the cloud media agent. After receiving the desktop stream, the cloud media agent encapsulates the application window information and the occluded window information, and sends the encapsulated information to the media resource center, where the media resource center sends the encapsulated information to other attendees of the video conference, i.e., desktop sharing clients of other attendees.

At operation 503, cutting the application window information based on the occluded window information, to obtain application window display information.

In operation 503, after receiving the encapsulated message, the desktop sharing client firstly decodes the encapsulated message, and cuts or tailors the application window information according to the occluded window information to obtain application window display information. The application window display information is information of the application window that is not occluded.

At operation 504, synchronously displaying the application window display information in a video conference main window.

In operation 504, the desktop sharing client displays the application window display information, and moves and scales the application window according to the application window display information. The video conference main window information is displayed at the cloud desktop client, and the video conference auxiliary window information is displayed at a cloud desktop server.

When the application sharing initiator terminates the application sharing, an application sharing end message is sent to the MCU, where the MCU forwards the application sharing end message to the video conference module of each attendee of the video conference, and then to the desktop sharing client.

Figure 6:
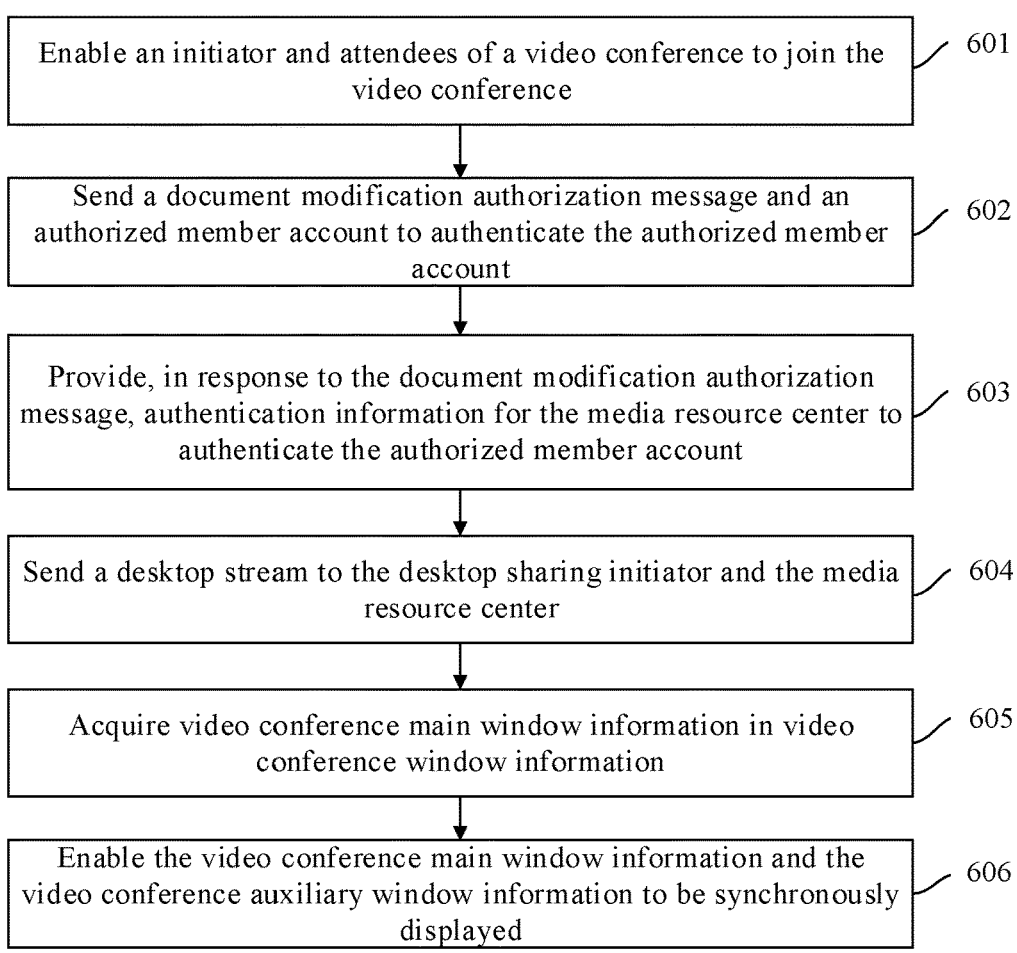
FIG. 6 is yet another flowchart of a method for implementing a video conference according to an embodiment of the present disclosure.

During desktop sharing or application sharing, if the voice communication cannot be understood mutually, for example, different native languages of the attendees cause communication obstacles, the attendees may be authorized to perform document modifications. FIG. 6 is yet another flowchart of a method for implementing a video conference according to an embodiment of the present disclosure. As shown in FIG. 6, the method for implementing a video conference may include operations 601 to 606.

At operation 601, enabling an initiator and attendees of a video conference to join the video conference.

In operation 601, the initiator and the attendees of the video conference may join the video conference through operations 301 through 304.

At operation 602, sending a document modification authorization message and an authorized member account to authenticate the authorized member account.

The authorized member account is an account which is authorized by a desktop sharing or application sharing initiator for one or more attendees to modify a document. The initiator may select an authorized member according to an attendee list, and then sends an authorized member account and a document modification authorization message to the cloud media agent. The cloud media agent forwards the authorized member account and the document modification authorization message to the media resource center, where the media resource center authenticates the authorized member account, i.e., judges whether a member is to be authorized according to the authorized member account.

At operation 603, providing, in response to the document modification authorization message, authentication information for the media resource center to authenticate the authorized member account.

In a possible implementation, after receiving the authorized member account, the media resource center sends an authorization authentication message to the desktop sharing client corresponding to the authorized member account. The desktop sharing client corresponding to the authorized member account provides authentication information, for example, provides language and identity authentication information of the authorized member through mouse key operation, so that the media resource center identifies the authorized member account based on the language and identity authentication information of the authorized member. The media resource center sends authentication information of the authenticated authorized member to the cloud desktop server. For an member account failing to pass the authentication, the media resource center does not perform any processing.

At operation 604, sending a desktop stream to the desktop sharing initiator and the media resource center.

In operation 604, the cloud desktop server sends the desktop stream to the desktop sharing initiator in the video conference and the media resource center, and the media resource center then sends the desktop stream to other attendees of the video conference, so that an authorized attendee may modify a document in the desktop stream.

At operation 605, acquiring video conference main window information in video conference window information.

In operation 605, other attendees of the conference obtain the desktop stream from the media resource center, where the desktop stream contains the video conference main window information.

At operation 606, enabling the video conference main window information and the video conference auxiliary window information to be synchronously displayed.

In operation 606, the video conference main window information is displayed at the cloud desktop client, and the video conference auxiliary window information is displayed at a cloud desktop server.

The video conference main window information includes main window location information and main window size information, and the video conference main window information is sent to the cloud desktop client via the cloud media agent, and displayed by the media presentation unit in the video conference module. When a location or a size of the main window of the video conference is changed, a video conference module window also changes correspondingly. For example, as the main window of the video conference moves from left to right, the video conference module window also changes accordingly. When the main window of the video conference is minimized, the video conference module window is moved out of a screen of the terminal.

According to the method for implementing a video conference provided in the embodiments of the present disclosure, after the video conference main window information in video conference window information is acquired, the video conference main window information is displayed at the cloud desktop client, and the video conference auxiliary window information is displayed at the cloud desktop server, and the video conference main window information and the video conference auxiliary window information are synchronously displayed so that the display effect of the video image is optimized, and the occupied network bandwidth resources and cloud server resources are reduced. In addition, this method for implementing a video conference can strip a display part of the video conference system to a terminal, thereby improving the utilization rate of terminal resources, and simplifying extra deployment and configuration of at the cloud.

Figure 7:
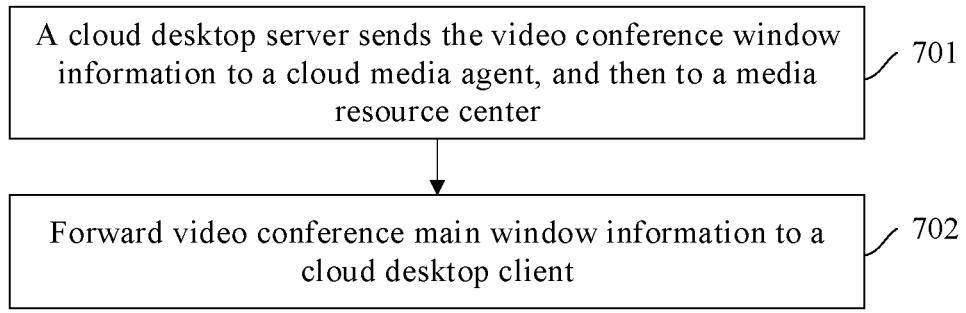
FIG. 7 is a flowchart of a method for implementing a video conference according to an embodiment of the present disclosure.

An embodiment of the present disclosure further provides a method for implementing a video conference, which is applicable to a cloud media agent. FIG. 7 is a flowchart of a method for implementing a video conference according to an embodiment of the present disclosure. Referring to FIG. 7, the method for implementing a video conference may include the following operations 701 and 702.

At operation 701, receiving, in response to a joining message of a video conference, video conference window information.

The video conference window information includes video conference main window information and video conference auxiliary window information. The video conference main window information includes specific contents of the video conference, such as materials displayed in the video conference, or other information. The video conference auxiliary window information includes a menu bar of the video conference.

In operation 701, a cloud desktop server sends the video conference window information to a cloud media agent, and then to a media resource center.

At operation 702, forwarding video conference main window information to a cloud desktop client.

In operation 702, the cloud media agent sends the video conference main window information to the media resource center, and then to the cloud desktop client. The video conference main window information is displayed at the cloud desktop client, the video conference auxiliary window information is displayed at the cloud desktop server, and the video conference main window information and video conference auxiliary window information in the video conference window information are synchronously displayed. In other words, the cloud desktop client displays merely the video conference main window information, but not the video conference auxiliary window information. Meanwhile, the cloud desktop server displays merely auxiliary window information of the video conference. According to the embodiment of the present disclosure, a display part of the video conference is stripped to a terminal, so that the data transmission amount between the cloud desktop client and the cloud server is reduced, the network bandwidth resource is saved, and the load capacity of the cloud server is reduced, while the display effect of the cloud desktop client is improved.

In a possible implementation, the video conference main window information includes main window location information and main window size information, and the video conference main window information is sent to the cloud desktop client via the cloud media agent, and displayed by the media presentation unit in the video conference module.

When a location or a size of the main window of the video conference is changed, a video conference module window also changes correspondingly. For example, as the main window of the video conference moves from left to right, the video conference module window also changes accordingly. When the main window of the video conference is minimized, the video conference module window is moved out of a screen of the terminal.

In a possible implementation, when the main window of the video conference is occluded by another window, the cloud desktop client, while obtaining the video conference main window information, obtains window occlusion information. When the video conference main window information and the video conference auxiliary window information are synchronously displayed, the video conference main window information, combined with the window occlusion information, is displayed at the window of the video conference module.

For example, when the main window of the video conference is occluded by another window, the video conference module window cuts the corresponding occlusion location. When the main window of the video conference is completely occluded by another window, the video conference module window is moved out of the screen of the terminal.

Figure 8:
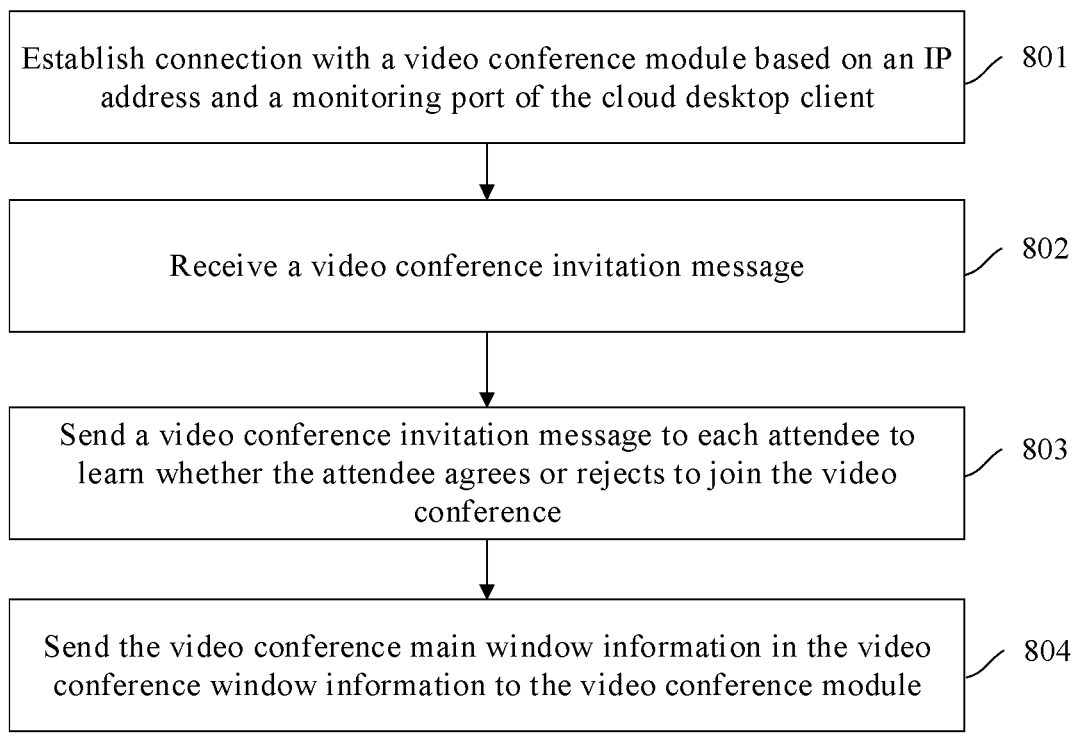
FIG. 8 is another flowchart of a method for implementing a video conference according to an embodiment of the present disclosure.

FIG. 8 is another flowchart of a method for implementing a video conference according to an embodiment of the present disclosure. As shown in FIG. 8, the method for implementing a video conference may include operations 801 to 804.

At operation 801, establishing connection with a video conference module based on an IP address and a monitoring port of the cloud desktop client.

In operation 801, when a user starts a video conference at a cloud desktop client, the video conference module and a cloud media agent of the cloud desktop will be pulled up. An address of an MCU and a user account of the current user who logs in the MCU are transmitted to the video conference module, where the video conference module creates, based on the address of the MCU and the current user account, a TCP server, and returns to the cloud desktop client a monitoring port of the video conference module.

The cloud desktop client transmits an IP address and a monitoring port of the cloud desktop client, an IP address and a monitoring port of a media resource center, and a monitoring port of a virtual machine component to the cloud media agent of the cloud desktop as starting parameters, where the cloud media agent is connected to the virtual machine component. The cloud desktop client sends the monitoring port of the video conference module and an IP address of the terminal to the virtual machine component through a desktop protocol, then the virtual machine component sends the monitoring port of the video conference module and the IP address of the terminal to the cloud media agent through a TCP link, and the cloud media agent establishes connection with the video conference module according to the IP address of the terminal and the monitoring port of the video conference module.

When the cloud media agent is connected to the monitoring port of the video conference module through the video conference module, an initiator of the video conference sends a type and attendees of the video conference to the MCU, which creates the video conference and invites the attendees.

Types of the video conference include single-point conference, video conference, and voice conference. The MCU creates a video conference according to a video conference type expected by the initiator, and then invites conference members according to the attendees provided by the initiator.

In a possible implementation, the initiator (chairman) of the video conference selects attendees to be invited by querying an address book or recent meeting records.

When no video conference exists, the initiator may create a video conference at the MCU. For example, the initiator sends a type and attendees of the video conference to the MCU, which in turn creates a video conference and invites the attendees.

According to the embodiment of the present disclosure, when the MCU creates the video conference, if the video conference fails to be created, an ERROR message is returned to the initiator. If the video conference is successfully created, a success message and a number of the created video conference are returned to the initiator. The number of the created video conference may be contained in the returned success message, that is, the number of the created video conference is sent to the initiator together with the success message that indicates successful creation of the video conference, or, the number of the created video conference and the success message that indicates successful creation of the video conference are sent to the initiator separately. At operation 802, receiving a video conference invitation message.

The video conference invitation message includes a video conference number and an initiator account of the video conference.

After receiving a list of attendees invited by the video conference initiator, the cloud media agent sends participation invitation information to the attendees to invite them to join the video conference.

At operation 803, sending a video conference invitation message to each attendee to learn whether the attendee agrees or rejects to join the video conference.

The attendee is a member to join the video conference confirmed by the initiator of the video conference.

In a possible implementation, when a conference invitation message is received at an member video conference module, the conference invitation message is forwarded to the cloud media agent which, after receiving the conference invitation message, may send a prompt message through a popup window. The attendee may choose to accept or reject the conference invitation and send a response message to the member video conference module, which forwards the response message to the MCU, and then to the video conference module corresponding to the initiator.

At operation 804, sending the video conference main window information in the video conference window information to the video conference module.

In operation 804, the cloud media agent sends the video conference main window information in the video conference window information to the video conference module, where the video conference main window information is displayed.

According to the embodiment of the present disclosure, the video conference main window information is displayed at the cloud desktop client, and the video conference auxiliary window information is displayed at a cloud desktop server. In other words, the cloud desktop client displays merely the video conference main window information, but not the video conference auxiliary window information. Meanwhile, the cloud desktop server displays merely auxiliary window information of the video conference. According to the embodiment of the present disclosure, a display part of the video conference is stripped to a terminal, so that the data transmission amount between the cloud desktop client and the cloud server is reduced, the network bandwidth resource is saved, and the load capacity of the cloud server is reduced, while the display effect of the cloud desktop client is improved.

Figure 9:
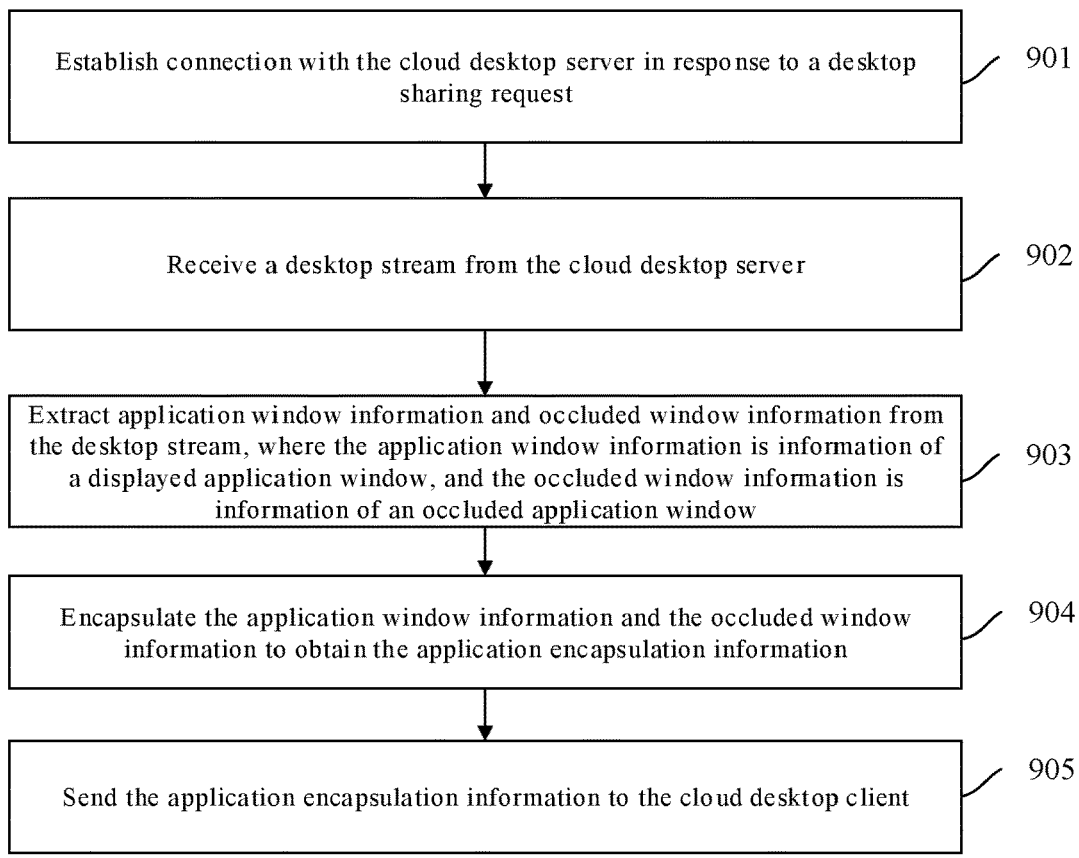
FIG. 9 is another flowchart of a method for implementing a video conference according to an embodiment of the present disclosure.

FIG. 9 is another flowchart of a method for implementing a video conference according to an embodiment of the present disclosure. As shown in FIG. 9, the method for implementing a video conference may include operations 901 to 905.

At operation 901, establishing connection with the cloud desktop server in response to a desktop sharing request.

After an initiator and attendees of a video conference join the video conference, either the initiator or an attendee of the video conference may initiate a desktop sharing request, and when the desktop sharing request is initiated, the desktop sharing initiator sends the conference number and the account number of the initiator of the video conference to other conference members.

In a possible implementation, the desktop sharing initiator sends the conference number and the account number of the initiator of the video conference to the MCU, which then sends the desktop sharing request to other members of the video conference. If any other conference member has started a desktop sharing function, an ERROR message is returned to the MCU. If other conference members do not start a desktop sharing function, it indicates that desktop sharing is available, and an OK message is returned to the MCU.

The MCU sends the conference number and the initiator account to the media resource center, where the media resource center correspondingly generates the desktop sharing connection parameter and the initiator account, and sends the desktop sharing connection parameter and the initiator account to the MCU, so that the MCU sends the desktop sharing connection parameter and the initiator account to all members of a same conference room. When a video conference module corresponding to a non-initiator receives the desktop sharing connection parameter and the initiator account, the cloud desktop client of the non-initiator is pulled up, and the cloud desktop client may obtain a desktop stream of the shared desktop from the media resource center according to the desktop sharing connection parameter and the initiator account.

It should be noted that, according to an embodiment of the present disclosure, the desktop sharing connection parameter and the initiator account are sent to the cloud desktop client through the MCU, and the cloud desktop client receives the desktop stream of the shared desktop. In another possible implementation, the desktop sharing connection parameter and the initiator account are sent to a desktop sharing client through the MCU. The desktop sharing client is disposed on the terminal and in communication with the video conference module, and obtains a desktop stream of the shared desktop from the media resource center according to the desktop sharing connection parameter and the initiator account.

At operation 902, receiving a desktop stream from the cloud desktop server.

The desktop stream is sent by a desktop sharing initiator, and other attendees of the conference obtain the desktop stream from the media resource center, where the desktop stream contains the video conference main window information.

At operation 903, extracting application window information and occluded window information from the desktop stream, where the application window information is information of a displayed application window, and the occluded window information is information of an occluded application window.

Any attendee of the video conference may initiate an application sharing message. An application sharing initiator sends an application sharing message to the cloud media agent, which opens the shared application and sets a window of the shared application as a child window of a cloud sharing agent. The shared application may be an application already opened by the cloud media agent, such as an application selected from applications already opened, or may be an application newly opened.

An initiator account is carried in the application sharing message, the cloud media agent sends the initiator account to the cloud desktop server, which then sends a desktop stream corresponding to the initiator account to the cloud media agent. After receiving the desktop stream, the cloud media agent encapsulates the application window information and the occluded window information, and sends the encapsulated information to the media resource center, where the media resource center sends the encapsulated information to other attendees of the video conference, i.e., desktop sharing clients of other attendees.

At operation 904, encapsulating the application window information and the occluded window information to obtain the application encapsulation information.

In operation 904, the cloud media agent encapsulates the application window information and the occluded window information to obtain the application encapsulation information.

At operation 905, sending the application encapsulation information to the cloud desktop client.

In operation 905, the cloud media agent sends the application encapsulation information to the cloud desktop client which, after receiving the encapsulation message, firstly decodes the encapsulated message, and cuts the application window information according to the occluded window information to obtain application window display information. The application window display information is information of the application window that is not occluded.

During desktop sharing or application sharing, if the voice communication cannot be understood mutually, for example, different native languages of the attendees cause communication obstacles, the attendees may be authorized to perform document modifications. In a possible implementation, after operation 901, the method may further include: forwarding a document modification authorization message and an authorized member account to a media resource center, for the media resource center to authenticate the authorized member account.

It should be noted that the authorized member account is an account which is authorized by a desktop sharing or application sharing initiator for one or more attendees to modify a document. The initiator may select an authorized member according to an attendee list, and then sends an authorized member account and a document modification authorization message to the cloud media agent. The cloud media agent forwards the authorized member account and the document modification authorization message to the media resource center, where the media resource center authenticates the authorized member account, i.e., judges whether a member is to be authorized according to the authorized member account.

In a possible implementation, after receiving the authorized member account, the media resource center sends an authorization authentication message to the desktop sharing client corresponding to the authorized member account. The desktop sharing client corresponding to the authorized member account provides authentication information, for example, provides language and identity authentication information of the authorized member through mouse key operation, so that the media resource center identifies the authorized member account based on the language and identity authentication information of the authorized member. The media resource center sends authentication information of the authenticated authorized member to the cloud desktop server. For an member accounts which do not pass the authentication, the media resource center does not perform any processing.

According to the method for implementing a video conference provided in the embodiments of the present disclosure, the cloud media agent sends the video conference main window information to the media resource center, and then to the cloud desktop client. The video conference main window information is displayed at the cloud desktop client, and the video conference auxiliary window information is displayed at the cloud desktop server, and the video conference main window information and the video conference auxiliary window information are synchronously displayed so that the display effect of the video image is optimized, and the occupied network bandwidth resources and cloud server resources are reduced.

An embodiment of the present disclosure further provides an apparatus for implementing a video conference, which is applicable to a cloud desktop client. The apparatus for implementing a video conference strips a display part of the video conference system to a terminal, so that the network and server resources occupied by the video conference system are reduced, and the display effect of the cloud desktop is improved.

Figure 10:
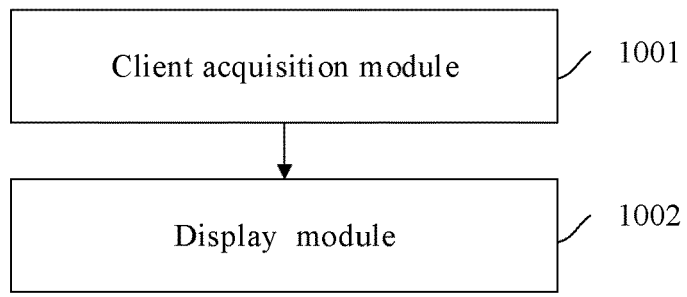
FIG. 10 is a schematic block diagram of an apparatus for implementing a video conference according to an embodiment of the present disclosure.

FIG. 10 is a schematic block diagram of an apparatus for implementing a video conference according to an embodiment of the present disclosure. Referring to FIG. 10, the apparatus for implementing a video conference may include a client acquisition module 1001 and a display module 1002.

The client acquisition module 1001 may be configured to acquire video conference main window information in video conference window information.

According to an embodiment of the present disclosure, the client acquisition module 1001 may be disposed in a video conference module, which is a part of a video conference system disposed in a cloud desktop client.

In a possible implementation, the video conference window information includes the video conference main window information and video conference auxiliary window information. The client acquisition module 1001 acquires the video conference main window information.

The display module 1002 may be configured to enable the video conference main window information and the video conference auxiliary window information to be synchronously displayed.

According to the embodiment of the present disclosure, the video conference main window information is displayed at the cloud desktop client, and the video conference auxiliary window information is displayed at a cloud desktop server. In other words, a display part of the video conference is stripped to a terminal, so that the data transmission amount between the cloud desktop client and the cloud server is reduced, the network bandwidth resource is saved, and the load capacity of the cloud server is reduced, while the display effect of the cloud desktop client is improved.

In a possible implementation, the client acquisition module 1001, while acquiring the video conference main window information, further obtains window occlusion information. When the video conference main window information and the video conference auxiliary window information are synchronously displayed, the occluded part of the video conference main window is not displayed.

The display module 1002 may be configured to, control, when the main window of the video conference is occluded by another window, the video conference module window to cut the corresponding occlusion location; and control, when the main window of the video conference is completely occluded by another window, the video conference window to be moved out of the screen of the terminal.

According to the apparatus for implementing a video conference provided in the embodiments of the present disclosure, a display part of the video conference system is stripped to a terminal, the client acquisition module 1001 acquires video conference main window information in video conference window information, the display module 1002 displays merely the video conference main window information, but not the video conference auxiliary window information, and the video conference main window information displayed by the display module 1002 is synchronous with the video conference auxiliary window information displayed at the cloud desktop server. In this manner, the display effect of the video image is optimized, and the occupied network bandwidth resources and cloud server resources are reduced. In addition, the apparatus for implementing a video conference strips a display part of the video conference system to a terminal, thereby improving the utilization rate of terminal resources, and simplifying extra deployment and configuration of at the cloud.

An embodiment of the present disclosure further provides an apparatus for implementing a video conference, which is applicable to a cloud media agent. The apparatus for implementing a video conference strips a display part of the video conference system to a terminal, so that the network and server resources occupied by the video conference system are reduced, and the display effect of the cloud desktop is improved.

Figure 11:
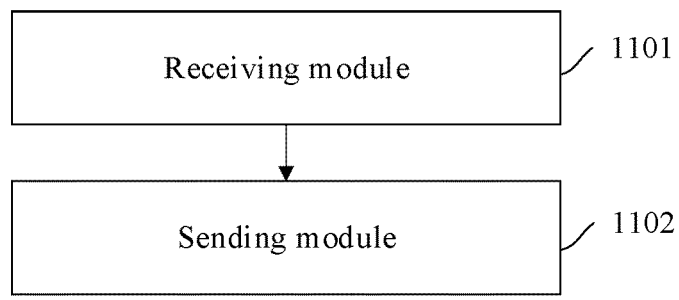
FIG. 11 is a schematic block diagram of an apparatus for implementing a video conference according to an embodiment of the present disclosure.

FIG. 11 is a schematic block diagram of an apparatus for implementing a video conference according to an embodiment of the present disclosure. Referring to FIG. 11, the apparatus for implementing a video conference may include a receiving module 1101 and a sending module 1102.

The receiving module 1101 may be configured to receive video conference window information of a video conference initiator.

According to an embodiment of the present disclosure, when the video conference initiator shares a desktop or an application, the video conference window information of the sharer is received.

The sending module 1102 may be configured to forward video conference main window information in the video conference window information to a cloud desktop client.

According to the embodiment of the present disclosure, the video conference window information includes video conference main window information and video conference auxiliary window information. The video conference main window information is displayed at the cloud desktop client, and the video conference auxiliary window information is displayed at a cloud desktop server.

According to the embodiment of the present disclosure, the cloud media agent sends merely the video conference main window information, but not the video conference auxiliary window information, to the cloud desktop client, thereby saving network resources. The cloud desktop client interacts with the cloud desktop server, so that the video conference main window information displayed at the cloud desktop client is synchronous with the video conference auxiliary window information displayed at the cloud desktop server.

In a possible implementation, the cloud media agent sends the video conference main window information to the media resource center, and then to the cloud desktop client.

In a possible implementation, the sending module 1102, while sending the video conference main window information, further sends window occlusion information, so that a corresponding occlusion location is cut when the cloud desktop client displays the video conference main window; and when the main window of the video conference is completely occluded by another window, the video conference window is moved out of the screen of the terminal.

According to the apparatus for implementing a video conference provided in the embodiments of the present disclosure, after receiving the video conference window information of the video conference initiator, merely the video conference main window information in the video conference window information is forwarded to the cloud desktop client, so that the video conference main window information displayed at the cloud desktop client is synchronous with the video conference auxiliary window information displayed at the cloud desktop server. In this manner, the display effect of the video image is optimized, and the occupied network bandwidth resources and cloud server resources are reduced.

For better understanding of the embodiments of the present disclosure, the following further introduces a video conference system according to the embodiments of the present disclosure in combination with the above method and apparatus for implementing a video conference.

Figure 12:
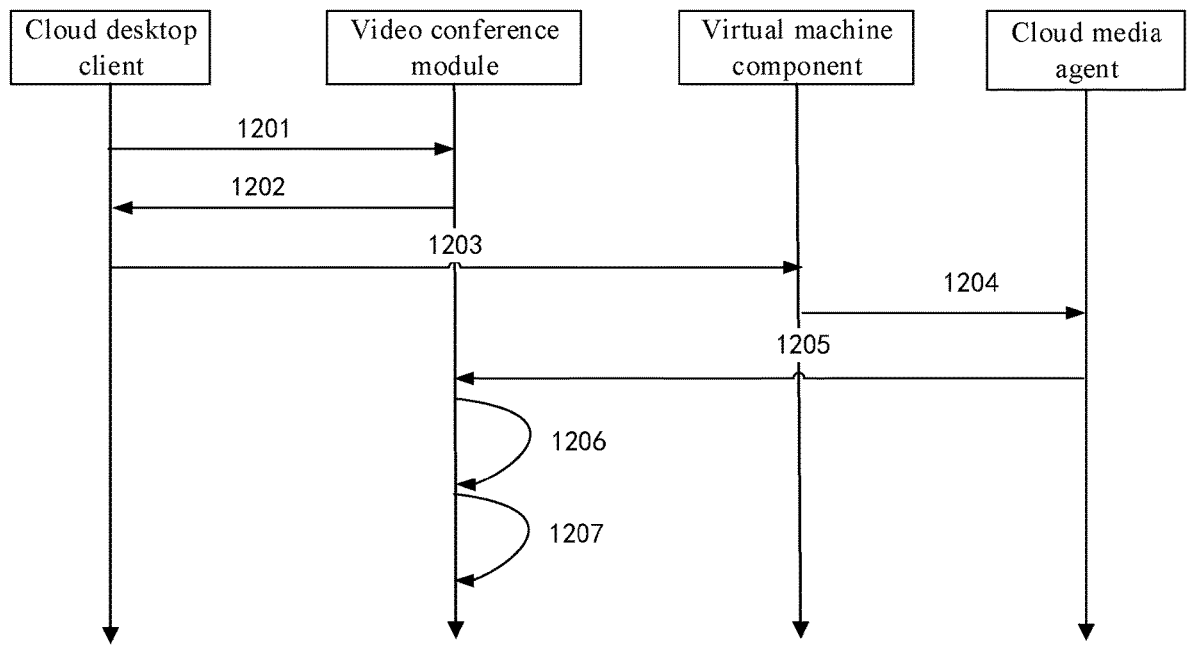
FIG. 12 is a flowchart of interaction between a video conference module, and a cloud desktop client and a cloud desktop server according to an embodiment of the present disclosure.

FIG. 12 is a flowchart of interaction between a video conference module, and a cloud desktop client and a cloud desktop server according to an embodiment of the present disclosure. As shown in FIG. 12, a process of the cloud desktop client logging in the video conference module may include operations 1201 to 1207.

At operation 1201, sending, by the cloud desktop client, an address of an MCU and a user name of a video conference initiator to the video conference module.

In operation 1201, the video conference initiator inputs the address of the MCU and the user name into the video conference module through a terminal. For example, the video conference initiator inputs the address of the MCU and the user name into the cloud desktop client through an input module of the terminal, and then to the video conference module.

At operation 1202, returning, by the video conference module, a monitoring port of the video conference module to the cloud desktop client.

In operation 1202, the video conference module creates a TCP server, and returns the monitoring port of the video conference module to the cloud desktop client.

At operation 1203, sending, by the cloud desktop client, an IP address of the cloud desktop client and the monitoring port of the video conference module to a virtual machine component.

In operation 1203, the cloud desktop client sends the monitoring port of the video conference module and an IP address of the cloud desktop client (the terminal) to the virtual machine component through a desktop protocol.

At operation 1204, sending, by the virtual machine component, the IP address and the monitoring port of the cloud desktop client, an IP address and a monitoring port of a media resource center, and a monitoring port of the virtual machine component to the cloud media agent.

In operation 1204, after receiving the IP address and the monitoring port of the cloud desktop client, the virtual machine component sends the IP address and the monitoring port of the cloud desktop client, the IP address and the monitoring port of the media resource center, and the monitoring port of the virtual machine component to the cloud media agent.

At operation 1205, sending the video conference main window information and the window occlusion information to the video conference module.

In operation 1205, after receiving the IP address and the monitoring port of the cloud desktop client, the IP address and the monitoring port of the media resource center, and the monitoring port of the virtual machine component, the cloud media agent establishes connection with a video conference module based on an IP address and a monitoring port of the cloud desktop client, and then sends the video conference main window information and the window occlusion information to the video conference module in real time.

At operation 1206, adjusting, by the video conference module, the window according to the video conference main window information and the window occlusion information.

When a location or a size of the main window of the video conference is changed, a video conference module window also changes correspondingly. For example, as the main window of the video conference moves from left to right, the video conference module window also changes accordingly. When the main window of the video conference is minimized, the video conference module window is moved out of a screen of the terminal.

At operation 1207, connecting the video conference module to the MCU, and enabling attendees to log in the MCU.

In operation 1207, the video conference module is connected to the MCU, the attendees log in the MCU through the cloud desktop client, and the server may check the logged-in attendees.

Figure 13:
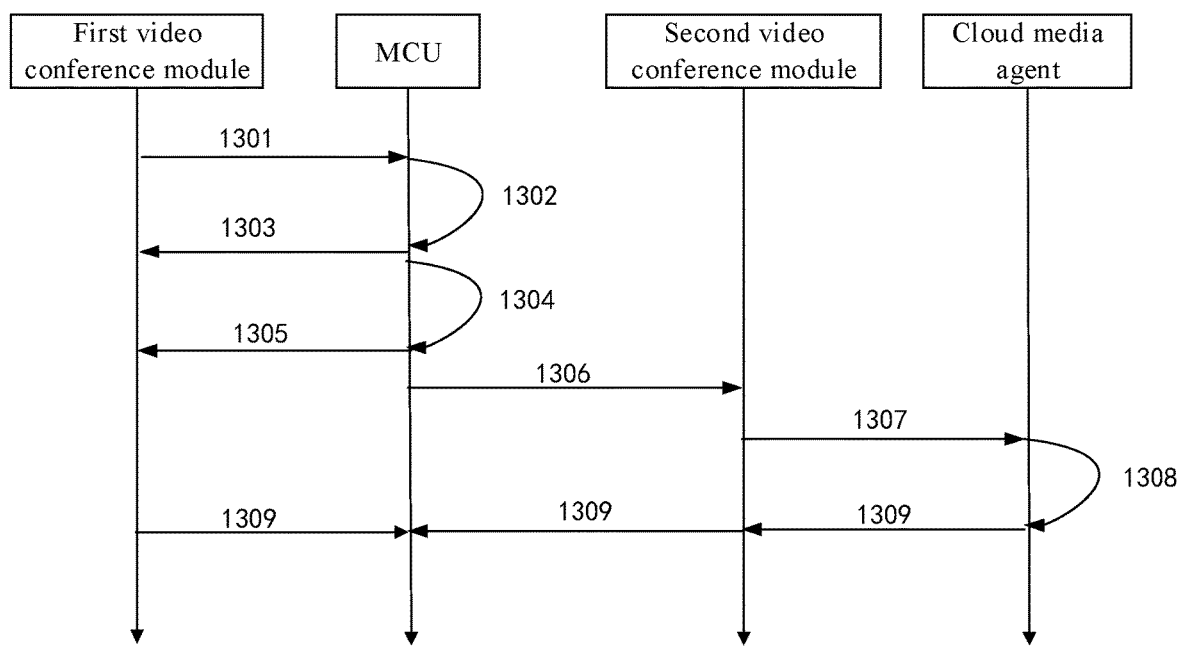
FIG. 13 is a flowchart of inviting attendees of a video conference according to an embodiment of the present disclosure.

FIG. 13 is a flowchart of inviting attendees of a video conference according to an embodiment of the present disclosure. As shown in FIG. 13, the process of inviting attendees of the video conference may include operations 1301 to 1309.

At operation 1301, a first video conference module of a video conference initiator sends an initiator account, a type of the video conference, and accounts of attendees invited to join the video conference to an MCU.

The video conference initiator may query an address book or a recent conference record to select the attendees. While initiating the video conference, the video conference initiator may further select a type of the video conference. Types of the video conference include single-point conference, video conference, and voice conference. The video conference initiator sends the initiator account number, the video conference type and the accounts of the attendees invited to join the video conference to the MCU through the video conference module.

In a possible implementation, when no video conference is present in the first video conference module, the video conference initiator may create a video conference through the first video conference module.

At operation 1302, the MCU creates a video conference.

In operation 1302, the MCU creates a video conference according to the video conference type selected by the video conference initiator.

At operation 1303, a conference number of the created video conference is sent to the video conference initiator.

In operation 1303, when the MCU successfully creates a video conference, a conference number of the created video conference is sent to the video conference initiator. When the MCU fails to create a video conference, a creation failed message is returned to the video conference initiator.

At operation 1304, the MCU matches whether each attendee is in a conference.

In operation 1304, the MCU matches, according to the list of invited attendees from the video conference initiator, whether the invited attendees are in another video conference one by one. When an invited attendee is in another video conference, it indicates that the attendee cannot accept the invitation. When an invited attendee is not in another video conference, it indicates that the attendee can accept the invitation.

At operation 1305, the MCU returns a response message to the first video conference module of the video conference initiator.

In operation 1305, when the MCU matches that the invited attendee is in another video conference, a response message indicating that the attendee cannot join the conference is returned. When the MCU matches that the invited attendee is not in another video conference, the MCU returns a response messages indicating that the attendee can join the conference to the video conference initiator.

At operation 1306, the MCU sends the conference number and the initiator account number to a second video conference module corresponding to a member able to join the video conference.

In operation 1306, the MCU sends the conference number of the created video conference and the account number of the video conference initiator to the video conference module corresponding to the member able to join the video conference.

At operation 1307, the video conference module of the video conference member forwards the conference number and the initiator account number to the cloud media agent.

In operation 1307, the cloud media agent refers to a cloud media agent of a member invited to join the conference.

At operation 1308, the cloud media agent gives a prompt of the video conference invitation.

In operation 1308, when receiving the member video conference module, the cloud media agent may give a prompt of the conference invitation with a popup window.

At operation 1309, the cloud media agent returns participation information of each invited member to the video conference module of the video conference member, and then to the MCU, where the MCU further returns the participation information to the video conference module corresponding to the video conference initiator.

In operation 1309, the participation information includes information of accepting or rejecting the conference invitation. In other words, the invited member may reject or agreed to join the conference.

Figure 14:
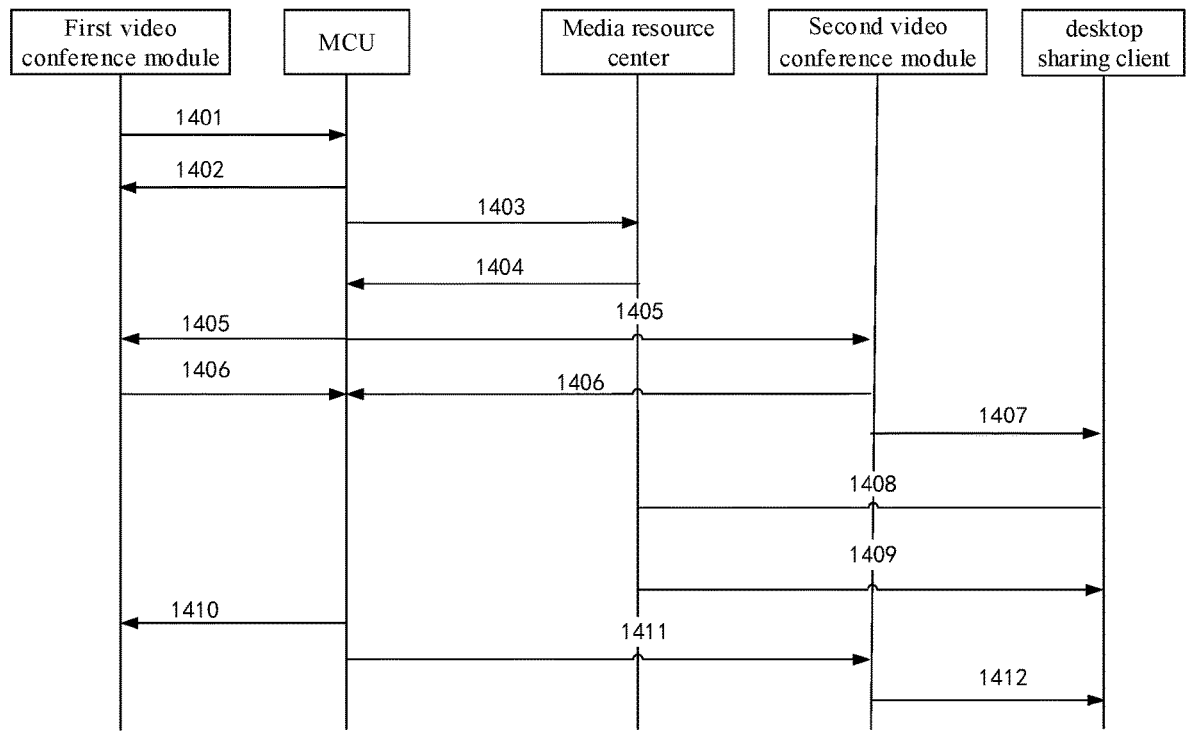
FIG. 14 is a flowchart of desktop sharing during collaborative office according to an embodiment of the present disclosure.

FIG. 14 is a flowchart of desktop sharing during collaborative office according to an embodiment of the present disclosure. The desktop sharing initiator may be any attendee, such as the video conference initiator or any other attendee of the video conference. For convenience of description, the following description will be given by taking the video conference initiator as the desktop sharing initiator. As shown in FIG. 14, the process of desktop sharing may include operations 1401 to 1412.

At operation 1401, a first video conference module sends a desktop sharing request to an MCU.

The first video conference module is a module owned by a sharer of the video conference, through which the sharer sends a desktop sharing request.

At operation 1402, the MCU returns a confirmation message indicating that the desktop sharing request is received to the first video conference module.

At operation 1403, the MCU sends a conference number and an initiator account number to a media resource center.

At operation 1404, the media resource center generates connection parameters according to the conference number and the initiator account, and returns the connection parameters and the initiator account to the MCU.

At operation 1405, the media resource center sends the connection parameters and the initiator account to all the attendees in the video conference.

At operation 1406, the first video conference module and a second video conference module return a connection completed message to the MCU.

At operation 1407, after receiving the connection parameters and the initiator account, the second video conference module starts a desktop sharing client, and transmits the connection parameters and the initiator account as starting parameters to the desktop sharing client.

The second video conference module is a video conference module corresponding to an attendee of the video conference, which starts the desktop sharing client, and transmits the connection parameters and the initiator account as starting parameters to the desktop sharing client.

The attendee of the video conference is an attendee other than the desktop sharing initiator. The desktop sharing client may be an external module independent of the cloud desktop client, or may be an internal module in the cloud desktop client. The desktop sharing client and the cloud desktop client may communicate with each other.

At operation 1408, after the initiator and the attendee of the video conference receive the connection parameters and the initiator account, the desktop sharing client establishes connection with the media resource center according to the connection parameters and an account of the client, and sends a message of agreeing to receive a desktop stream to the MCU.

At operation 1409, the desktop sharing client receives a desktop stream from the media resource center.

At operation 1410, when the desktop sharing is ended, the first video conference module sends a sharing ended message to the MCU.

At operation 1411, the MCU forwards the sharing ended message to the second video conference module.

At operation 1412, the second video conference module forwards the sharing ended message to the desktop sharing client.

Figure 15:
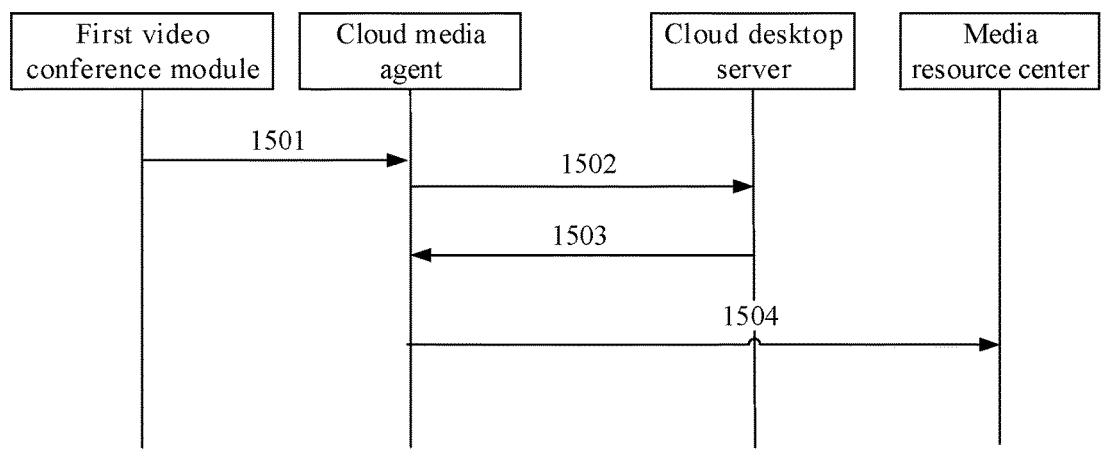
FIG. 15 is a flowchart of a media resource center acquiring a desktop stream according to an embodiment of the present disclosure.

In a possible implementation, the media resource center obtains the desktop stream through a cloud media agent. FIG. 15 is a flowchart of a media resource center acquiring a desktop stream according to an embodiment of the present disclosure. As shown in FIG. 15, the process of acquiring a desktop stream through a media resource center may include operations 1501 to 1504.

At operation 1501, the first video conference module initiates a desktop sharing request message to the cloud media agent.

The first video conference module is a video conference module corresponding to the sharer, and the first video conference module initiates a desktop sharing request message to the cloud media agent.

When the desktop sharer successfully applies to the MCU for desktop sharing, a desktop sharing request message and an initiator account are sent to the cloud media agent.

At operation 1502, the cloud media agent sends the initiator account to the cloud desktop server.

The cloud media agent establishes a link with the cloud desktop server according to an IP address and a port of the cloud desktop server obtained at starting, and sends the desktop sharing message and the initiator account to the cloud desktop server.

At operation 1503, according to the initiator account, the cloud desktop server forwards a desktop stream corresponding to the account to the cloud media agent.

At operation 1504, the cloud media agent forwards the desktop stream to the media resource center.

Figure 16:
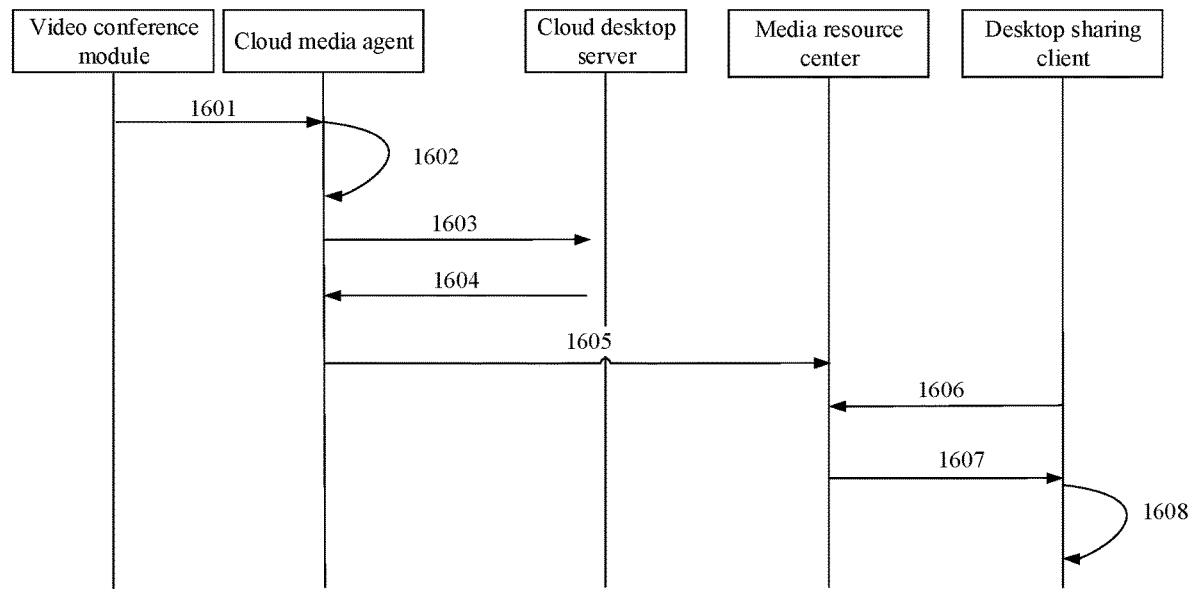
FIG. 16 is a flowchart of application sharing according to an embodiment of the present disclosure.

In a possible implementation, instead of the entire desktop, the desktop sharing initiator wants to share merely an application to attendees of the video conference. FIG. 16 is a flowchart of application sharing according to an embodiment of the present disclosure. As shown in FIG. 16, the process of application sharing may include operations 1601 to 1607.

At operation 1601, a video conference sharer initiates an application sharing message to a cloud media agent.

At operation 1602, the cloud media agent opens the application.

In a possible implementation, the cloud media agent opens the application, or selects the application that is opened, and sets a window of the application as a child window of the cloud sharing agent.

At operation 1603, the cloud media agent sends an account of the application sharing initiator to the cloud desktop server.

At operation 1604, the cloud desktop server sends a desktop stream to the cloud media agent.

In a possible implementation, the desktop stream includes application window information and occluded window information.

At operation 1605, the cloud media agent encapsulates location information of the application window and the occluded window information, and then forwards the encapsulated desktop stream to the media resource center.

At operation 1606, the media resource center sends the encapsulated desktop stream to a desktop sharing client.

At operation 1607, the desktop sharing client decapsulates the desktop stream, cuts the location information of the application window according to the occluded window information, and displays the cut application window information in a scaling manner.

In a possible implementation, during desktop sharing or application sharing, if the attendees speak different languages, the case where a document or speech cannot be understood by each other may occur. According to the embodiment of the present disclosure, in this case, the attendees may be authorized to modify the document, that is, entitled sharing authorization.

Figure 17:
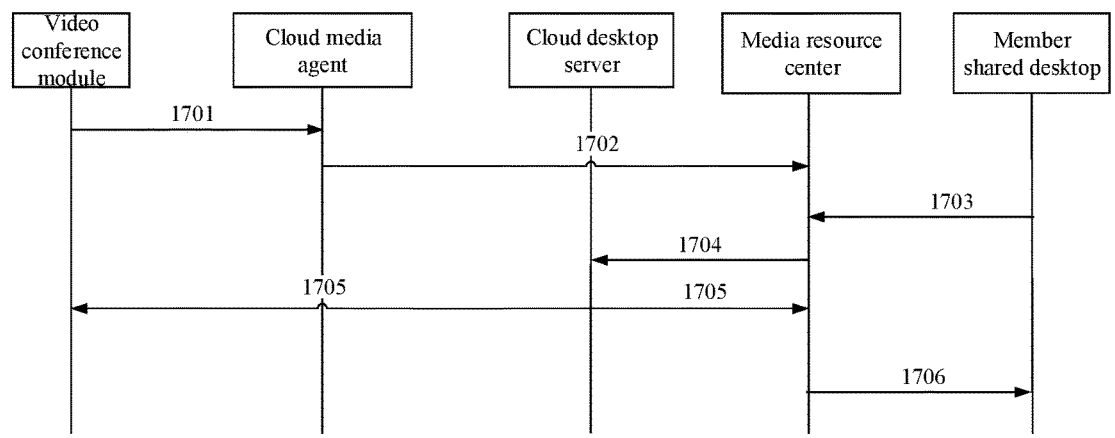
FIG. 17 is a flowchart of sharing authorization according to an embodiment of the present disclosure.

FIG. 17 is a flowchart of sharing authorization according to an embodiment of the present disclosure. As shown in FIG. 17, the process of sharing authorization may include operations 1701 to 1706.

At operation 1701, a desktop sharer sends authorization message to a cloud media agent.

In a possible implementation, the desktop sharer selects authorized members according to an attendee list; and sends an authorization message to the cloud media agent. The authorization message includes an account of an authorized member and an authorization instruction.

At operation 1702, the cloud media agent sends the authorization message to a media resource center.

At operation 1703, the desktop sharing client performs a mouse key operation to provide language and identity authentication information of the authorized member.

At operation 1704, the media resource center authenticates the authorized member according to the member account, and forwards the language and identity authentication information of the authorized member to a cloud desktop server.

In a possible implementation, if the authorized member to be authenticated is already an authorized member, information of the mouse key operation is forwarded to the cloud desktop server; and if the member is not unauthorized, no processing is performed.

At operation 1705, the cloud desktop server sends a desktop stream to the video conference module and corresponding to the desktop sharer and the media resource center.

At operation 1706, the media resource center forwards the desktop stream to a member shared desktop.

Figure 18:
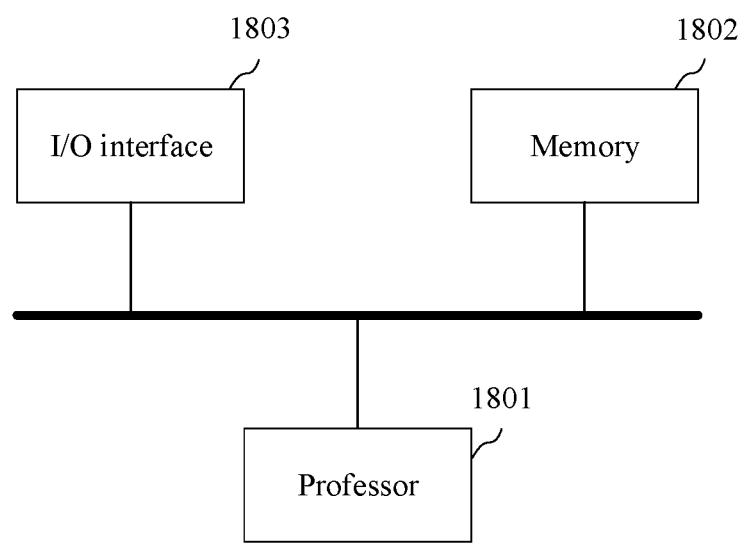
FIG. 18 is a schematic block diagram of an electronic device according to an embodiment of the present disclosure.

An embodiment of the present disclosure further provides an electronic device. FIG. 18 is a schematic block diagram of an electronic device according to an embodiment of the present disclosure. The electronic device may include: one or more processors 1801; a memory 1802 having one or more programs stored thereon which, when executed by the one or more processors 1801, cause the one or more processors 1801 to implement the method for implementing a video conference according to any embodiment of the present disclosure; and one or more I/O interfaces 1803 connected between the processor 1801 and the memory 1802 and configured to enable information interaction between the processor and the memory 1802.

The processor 1801 is a device with a data processing capability, including but not limited to a central processing unit (CPU), or the like. The memory 1802 is a device with a data storage capability including but not limited to, a random access memory (RAM, more specifically SDRAM, DDR, etc.), a read only memory (ROM), an electrically erasable programmable read only memory (EEPROM) or a flash memory (FLASH). The I/O interface (read/write interface) 1803 is connected between the processor 1801 and the memory 1802 to enable information interaction between the processor 1801 and the memory 1802, and includes, but is not limited to, a bus or the like.

In a possible implementation, the processor 1801, the memory 1802, and the I/O interface 1803 are interconnected via a bus, and in turn connected to other components of the electronic device.

An embodiment of the present disclosure further provides a computer-readable storage medium storing a computer program thereon which, when executed by a processor, causes the method for implementing a video conference according to any embodiment of the present disclosure to be implemented.

Those of ordinary skill in the art will appreciate that all or some operations of the above described method, functional modules/units in the system and apparatus may be implemented as software, firmware, hardware, and suitable combinations thereof. In a hardware implementation, the division between the functional modules/units mentioned in the above description does not necessarily correspond to the division of physical components; for example, one physical component may have multiple functions, or one function or operation may be performed cooperatively by several physical components. Some or all physical components may be implemented as software executed by a processor, such as a CPU, a digital signal processor or microprocessor, or implemented as hardware, or implemented as an integrated circuit, such as an application specific integrated circuit. Such software may be distributed on a computer-readable medium which may include a computer storage medium (or non-transitory medium) and communication medium (or transitory medium). As is well known to those of ordinary skill in the art, the term computer storage medium includes volatile and nonvolatile, removable and non-removable medium implemented in any method or technology for storing information, such as computer-readable instructions, data structures, program modules or other data. The computer storage medium includes, but is not limited to, an RAM, an ROM, an EEPROM, a flash or any other memory technology, a CD-ROM, a digital versatile disc (DVD) or any other optical disc storage, a magnetic cartridge, a magnetic tape, a magnetic disk storage or any other magnetic storage device, or may be any other medium used for storing the desired information and accessible by a computer. Moreover, it is well known to those ordinary skilled in the art that a communication medium typically includes a computer-readable instruction, a data structure, a program module, or other data in a modulated data signal, such as a carrier wave or other transport mechanism, and may include any information delivery medium.

The present disclosure has disclosed exemplary embodiments, and although specific terms are employed, they are used and should be interpreted merely in a generic and descriptive sense, not for purposes of limitation. In some instances, as would be apparent to one skilled in the art, features, characteristics and/or elements described in connection with a particular embodiment may be used alone or in combination with features, characteristics and/or elements described in connection with another embodiment, unless expressly stated otherwise. It will, therefore, be understood by those skilled in the art that various changes in form and details may be made therein without departing from the scope of the present disclosure as set forth in the appended claims.

What is claimed is:

1. A method for implementing a video conference, applied to a cloud desktop client, comprising:
    acquiring video conference main window information in video conference window information, wherein the video conference window information comprises the video conference main window information and video conference auxiliary window information, wherein the video conference auxiliary window information includes a menu bar of a video conference; and
    synchronously displaying the video conference main window information and the video conference auxiliary window information, wherein the video conference auxiliary window information is displayed at a cloud desktop server, wherein the video conference main window information is displayed at the cloud desktop client.

2. The method according to claim 1, wherein before acquiring the video conference main window information in the video conference window information, the method further comprises:
    creating, based on an address of a multi control unit (MCU) and a current user account, a transmission control protocol (TCP) server; wherein the current user account is an account of a user who initiates the video conference; and
    establishing connection with the MCU through the TCP server.

3. The method according to claim 2, wherein after establishing the connection with the MCU through the TCP server, the method further comprises:
    sending a type and attendees of the video conference to the MCU so that the MCU creates the video conference and invites the attendees; and
    receiving a video conference response message returned from a cloud desktop client corresponding to each conference member.

4. The method according to claim 3, wherein after receiving the video conference response message returned from the cloud desktop client corresponding to conference member, the method further comprises:
    initiating a desktop sharing message; wherein the desktop sharing message comprises a conference number and an initiator account the video conference;
    establishing connection with a media resource center based on a desktop sharing connection parameter and an account of a desktop sharing initiator; wherein the desktop sharing connection parameter is a parameter generated by the media resource center based on the conference number and the initiator account of the video conference; and
    receiving a desktop stream of the desktop sharing initiator forwarded by the media resource center.

5. The method according to claim 4, wherein after receiving the desktop stream of the desktop sharing initiator forwarded by the media resource center, the method further comprises:
    initiating an application sharing message so that a cloud media agent encapsulates application window information and occluded window information; wherein the application window information is information of a displayed application window, and the occluded window information is information of an occluded application window.

6. The method of claim 5, wherein after receiving the desktop stream of the desktop sharing initiator forwarded by the media resource center, the method further comprises:
    cutting the application window information based on the occluded window information, to obtain application window display information; and
    synchronously displaying the application window display information in a video conference main window.

7. The method according to claim 6, wherein after initiating the desktop sharing message, the method further comprises:
    sending a document modification authorization message and an authorized member account to authenticate the authorized member account.

8. The method according to claim 7, wherein before receiving the desktop stream of the desktop sharing initiator forwarded by the media resource center, the method further comprises:
    providing, in response to the document modification authorization message, authentication information for the media resource center to authenticate the authorized member account.

9. The method according to claim 1, wherein before synchronously displaying the video conference main window information and the video conference auxiliary window information, the method further comprises:
    simultaneously and respectively sending the video conference main window information and the video conference auxiliary window information to the cloud desktop client and the cloud desktop server; and
    enabling the cloud desktop client to display the acquired video conference main window information in real time, and simultaneously enabling the cloud desktop server to display the acquired video conference auxiliary window information in real time.

10. An apparatus for implementing a video conference, comprising a client acquisition module and a display module, and configured to, when operated by a processor, carry out the method according claim 1.

11. An electronic device, comprising:
one or more processors;
a memory having one or more programs stored thereon which, when executed by the one or more processors, cause the one or more processors to implement the method for implementing a video conference according to claim 1;
one or more I/O interfaces connected between the one or more processors and the memory, and configured to enable information interaction between the one or more processors and the memory.

12. A non-transitory computer-readable storage medium having one or more programs stored thereon, wherein the one or more programs are executable by one or more processors to implement the video conference implementation method according to claim 1.

* * * * *